United States Patent Office 3,450,483
Patented June 17, 1969

3,450,483
METHOD OF PREPARING RAWHIDE
Lars E. Nordstrom, Curwensville, Pa., assignor to Superior Pet Products, Inc., Curwensville, Pa., a corporation of Massachusetts
No Drawing. Filed Mar. 21, 1966, Ser. No. 535,666
Int. Cl. D06l 3/02
U.S. Cl. 8—111         4 Claims

ABSTRACT OF THE DISCLOSURE

A rawhide product resembling animal bone is prepared by bleaching rawhide at a pH between about 9 and 11 in a hydrogen peroxide water solution, then removing the excess solution and drying the hide.

---

There are available on the market today simulated or artificial bones for dog owners to buy for their dogs, the bones having somewhat the shape of a natural bone, and being made of material such as a prepared rawhide which is suitable for consumption by the dogs. In many ways, these bones presently available are satisfactory, but in other ways they leave several things to be desired. For example, in some instances the color of the simulated bone, as sold, may be greatly improved. In other instances, the finished product as sold can be improved as to the simulation or imitation of the shape of the natural animal bone.

In general, then, this invention is concerned with producing an improved material for a simulated animal bone which has a pleasing color and appearance acceptable to a prospective purchaser, and where the bone is suitable as a dog food and plaything and closely a natural bone in appearance, shape, and hardness.

Therefore, among the several objects and advantages of the invention may be the following: the provision of an improved method of making rawhide; the provision of a simple and economical method of making improved material from which a simulated animal bone can be formed; the provision of methods of the above classes which are adapted to mass production; and the provision of an improved method of making rawhide which results in a material which is edible as animal food.

Other objects and advantages of the invention will be in part obvious and in part pointed out hereinafter.

The process consists generally of washing limed and unhaired, untanned rawhide in water sufficient to cause the pH to be between about 9 and 11, and then agitating the hide in a hydrogen peroxide water solution containing hydrogen peroxide in an amount and at a concentration to bleach the hide to a substantially white color. Thereafter the excess solution is removed and the hide is dried into a hard bonelike product.

The improved method of this invention for preparing the bleached rawhide from which the simulated bone is to be made, is as follows:

Bellies are cut from hides which have been treated in a beam house operation which would make the hides suitable for vegetable tanning. These operations include the steps of washing, soaking, liming, unhairing, fleshing, scudding, and washing and bating (partly deliming). These operations are carried out to the point that the hides have a pH of approximately 10 to 10.5. The stated pH is only approximate, because hides which have been only partly delimed do not have a uniform cross-sectional pH. If the hides at this stage fall within this pH range, then the strongest bleaching effect will be obtained in the steps that follow. Bating may be done, and if so, the key is to take the hides for the cutting and subsequent steps of the method at the point where the hide cross-section pH is within the above range.

The bellies and their contained water are then weighed, and placed in a rotatable drum, having means to permit the flow out of water from the drum, such as by using a conventional drum with a slotted door. Means are also provided for flowing water into the drum, either by the same slotted door or by other means. This drum with its bellies is now rotated at a speed of approximately 12 revolutions per minute, this speed not being critical. This speed can be varied from 3 to 25 r.p.m., but at the higher speeds, there is a tendency for the bellies to tie together in knots. At lower speeds, there will be less of a washing effect, and therefore washing must continue for a longer period of time.

During this drum washing, water at a temperature of 60°–70° F. is flowed into and out of the drum continuously, the temperature of the bellies and water being maintained within this temperature range. The specified washing temperature range of 60°–70° F. is not a fixed range, but is preferred because of the danger of enzyme activity at higher temperatures (for example, 90°–105° F.) which would cause a breakdown of the substance of the hide when oxidative bleaching is employed.

Basically, the purpose of the washing is to get rid of excess enzyme residues, and while probably not all enzyme residues are removed, nevertheless sufficient residues will be removed so that the bellies will not decompose during the remainder of the operations, or in the finished product of this invention. As an example of a practical operation, the stated speed of 12 r.p.m., with water at a temperature of 60°, 70° F., washing being done for approximately 30 minutes, will provide sufficient enzyme residue removal where the drum size is 8 feet by 8 feet, the hide load is approximately 4,000 pounds, and the water flow into the drum and out is approximately 50 gallons per minute. The values given of load weight, water flow, temperature and drum revolution speed will give excellent production from the indicated drum size of 8 feet by 8 feet.

It is to be pointed out that excessive washing, for example, for several hours, will have an adverse effect on the later bleaching operations. The reason for this is probably that too much alkali will have been washed out of the bellies, and the pH range for the bleaching step will not be attained.

After the above washing is finished, excess water is drained from the drum and its contents. There is then added to the drum and the contained hides 12 percent (by weight of the bellies and their contained water) of hydrogen peroxide of 35 percent strength in water. If the drainage has been complete, then enough water should be added to obtain a final 17 percent concentration of hydrogen peroxide in the drum.

The above given figures of 12 percent and 17 percent are critical for optimum results. The final concentration of the hydrogen peroxide may fall, if desired, within the range of 9 percent to 15 percent, the final color and substance of the finished product being dependent on the actual percentage of the hydrogen peroxide concentration. If a lesser amount of the bleaching agent is used, then the finished rawhide will not be as white a color, and if a higher is used, then the finished rawhide will not have as much substance. It has been found that the indicated final 17 percent concentration of $H_2O_2$ in water in the drum produces optimum results.

Instead of adding first the 12 percent hydrogen peroxide of 25 percent strength, a solution of 17 percent hydrogen peroxide could first be made up and then added to the drum. However, in practice, complete drainage of the hides in the drum is never obtained, and therefore the preferred procedure is that set forth above.

Having obtained the 17 percent hydrogen peroxide concentration in the drum, the latter is then rotated (with a tight door in order to prevent loss of the bleaching solution) intermittently for four hours. The procedure is to rotate the drum for five turns during a period of approximately 30 seconds, stop the drum for a period of approximately 14½ minutes, and then rotate five turns again and so forth, this intermittent procedure being carried out for four hours. The speed of rotation of the drum is to be 12 r.p.m.

The time of bleaching is dependent on the amount of load and the amount of actual rotating time of the drum. It has been found that in order to control the bleaching action best without decomposing the bellies, the stated period of time and intermittent rotation, at a drum speed of 12 r.p.m. will give the best results. Actually, a practical range of time can be from 2 to 8 hours, again dependent on the load of bellies in the drum.

At the end of the four hours of drumming time, water is added at 105° F. temperature, the weight of water added being equal to the weight of the bellies with their contained water ascertained just before the above described washing operation. The 100% figure is not critical, and can range from 50% to 105%. Thereafter, the drum is again rotated intermittently for another four hours, using the same schedule of five rapid turns in approximately 30 seconds, a rest period of approximately 14½ minutes, and then successive periods of like kind during the four hours.

The temperature of 105° F. for the added water is not critical, and can range from 90° F. to 110° F. During the drumming operation, it will be found that the temperature of the drum contents will drop during the four hour treating time to approximately 95° F. to 100° F. The final temperature of the end of the drumming operation should range from 85° F. to 105° F. In respect to the intermittent drumming operation after the water has been added, the four hour period is not fixed. It can be shorter than this with a smaller load, and it definitely can be longer. The lesser the time of rotations of the drum, the longer the total period can be without deterioration of the bellies.

At the end of the above described bleaching operation, the pH and temperature are checked. The purpose of this is to make sure that the proper procedure has been followed, and that the final temperature, as indicated above, preferably should be between 85° and 105° F. The pH of the solution should range between 9.1 and 9.8. If desired, equipment can be used for the automatic recording of the pH and the temperature in the drum. However, it will be found that if the above steps are followed, then the use of such equipment is not necessary.

It has been found that heat is developed during the bleaching operation, and that there will be decomposition of the hide material if any one of the following things has occurred:

(1) The drum has been run for too long a time.
(2) Too much bleaching agent ($H_2O_2$), has been used.
(3) Too little water has been added, or the water has been too warm when added and during the drumming operation.
(4) There is an insufficient washing time.

It has been found that the finished simulated rawhide will have an undesirable color, and therefore less sales appeal, if any of the following occur:

(1) The drum has been rotated too little.
(2) Too little of the bleaching agent ($H_2O_2$), has been used.
(3) Too much water has been added.
(4) The added water has been too cold.
(5) The washing time has been of insufficient length.

The bellies are then removed from the drum and transferred to a suitable area (for example, to a storage area), where they are stored for a period of 8 to 12 hours. The purpose of this is to allow drainage of the water and $H_2O_2$ from the bellies, and this drainage procedure is recommended as a practical matter for a production scale operation. However, if desired, the bellies could be wrung out, for example twice, and the same result as storage for the 8–12 hours could thus be obtained.

After drainage, the excess gas and water are pressed out and skiving off of any excess flesh are done in a wringer type setting out machine. The purpose of wringing the bellies is to put them in proper condition for the folding and wrapping operations used in making simulated animal bones as set forth in a co-pending United States patent application in the name of Leo C. Ganoe and filed of even date herewith. It is not necessary to skive off any excess flesh, but the absence of excess flesh aids in the operations of folding, gives less trouble in the subsequent drying operation, and results in a final product (the simulated bone) which needs no cleaning. At this point, for optimum results in the finished bone product, the hide cross-sectional pH should be 7–8.5.

In view of the above, it will be seen that the several objects of the invention are achieved, and other advantageous results attained.

Having described the invention, what is claimed is:

1. The method of treating rawhide to produce a product resembling animal bone comprising washing limed and unhaired, untanned hide in water sufficiently to cause the pH to be between about 9 and 11, then agitating the hide in a hydrogen peroxide-water solution containing hydrogen peroxide in an amount and at a concentration sufficient to bleach the hide to substantially white color, and thereafter removing the excess water and drying the hide.

2. A bleached untanned rawhide made by the method of claim 1.

3. The method of treating rawhide to produce a product resembling animal bone comprising washing unhaired, at least partially delimed, untanned hide having a pH between about 9 and 11 in water sufficiently to remove enzymes without lowering the pH to below about 9, then contacting the hide with a hydrogen peroxide-water solution containing hydrogen peroxide in an amount and at a concentration sufficient to bleach the hide to substantially white color, and thereafter removing the excess water and drying the hide.

4. A bleached untanned rawhide made by the method of claim 3.

References Cited

UNITED STATES PATENTS 2,004,043  6/1935  Engels _____ 8—101 XR

MAYER WEINBLATT, *Primary Examiner.*

U.S. Cl. X.R.

8—101, 94.15, 94.16, 94.17; 252—99